(12) United States Patent
Benson et al.

(10) Patent No.: US 6,908,699 B1
(45) Date of Patent: Jun. 21, 2005

(54) FUEL CELL

(75) Inventors: Robert Frederick Benson, St. Petersburg, FL (US); Lawrence C. Langebrake, Seminole, FL (US)

(73) Assignee: University of South Florida, Tampa, FL (US)

( * ) Notice: Subject to any disclaimer, the term of this patent is extended or adjusted under 35 U.S.C. 154(b) by 402 days.

(21) Appl. No.: 10/064,391

(22) Filed: Jul. 9, 2002

(51) Int. Cl.⁷ .............................................. H01M 8/04

(52) U.S. Cl. ...................................................... 429/17

(58) Field of Search ............................. 429/15, 17, 19, 429/20, 105, 5, 218.1, 26, 34, 13, 29, 30, 31, 39, 44, 42, 40; 423/579, 580.1, 581, 584, 585, 586; 502/185; 361/508

(56) References Cited

U.S. PATENT DOCUMENTS

| | | | | |
|---|---|---|---|---|
| 3,825,445 | A | * 7/1974 | MacCarthy | .................. 429/15 |
| 4,317,863 | A | * 3/1982 | Struthers | ..................... 429/19 |
| 6,689,711 | B2 | * 2/2004 | Lefebvre | .................... 502/185 |
| 6,849,356 | B2 | * 2/2005 | Dow et al. | .................. 429/105 |
| 2002/0037452 | A1 | * 3/2002 | Schmidt | .................. 429/218.1 |

OTHER PUBLICATIONS

Fuel Cells 2000—The Online Fuel Cell Information Center; What is a Fuel Cell?; http://www.fuelcells.org/whatis/htm; Feb. 12, 2002.
Fuel Cells 200—The Online Fuel Cell Information Center; Types of Fuel Cells; http://www.fuelcells.org/fctypes.htm; Feb. 12, 2002.
Scientific American—Solid Oxide Electrolyte Fuel Cells; http://www.sciam.com/explorations/122396explorationsbox3.html; Feb. 12, 2002.
Scientific American—Phophoric Acid Fuel Cells; http://www.sciam.com/explorations/122396explorationsbox1.html; Feb. 12, 2002.
Scientific American—Molten Carbonate Fuel Cells; http://www.sciam.com/explorations/122396explorationsbox2.html; Feb. 12, 2002.
Scientific American—Beyond Batteries: Here Comes Fuel Cells—the Ultimate Clean Machines for Generating Electricity; http://www.sciam.com/explorations/122396explorations.html; Feb. 12, 2002.
Aluminum–Power, Inc.—Technology Behind the Fuel Cell; http://www.aluminum–power.com/technology.htm; Feb. 20, 2002.
Eyefor fuelcells; BCC Reports on Market for Metal–Air Fuel Cells; http://www.eyeforfuelcells.com/ReportDisplay.asp?ReportID=854; Feb. 20, 2002.
American Metal Market: New Aluminum–Air Fuel Cell Outlasts other Power Sources; http://www.findarticles.com/cf_1/m3MKT/171_108/65107093/print.jhtml; Feb. 20, 2002.

(Continued)

*Primary Examiner*—Michael Barr
*Assistant Examiner*—Robert Hodge
(74) *Attorney, Agent, or Firm*—Anton J. Hopen; Smith & Hopen, P.A.

(57) ABSTRACT

The present invention is a method of generating electrical energy from chemically generated hydrogen and oxygen including the steps of establishing a first reaction compartment, generating hydrogen gas from a reaction of aluminum metal and aqueous alkali solution in the first reaction compartment, establishing a second reaction compartment, generating oxygen gas from a reaction of oxygenated salt, water and a catalyst in the second reaction compartment, fluidly coupling the first reaction compartment to a fuel cell anode, fluidly coupling the second reaction compartment to a fuel cell cathode, and feeding the hydrogen and oxygen gas to a fuel cell to generate electricity.

10 Claims, 5 Drawing Sheets

OTHER PUBLICATIONS

Aluminum/Air Batteries; http://www.ectechnic.co.uk/ALUMAIR.html; Feb 13, 2002.

Electro–Chem–Technic; Aluminum Air Cell; A Brilliant Device for Safe Experiments on Batteries and other Topics in Chemistry; http://www.ectechnic.co.uk/ALAIRUK.html; Feb. 13, 2002.

Alternative.energy—The Solutions, Now—Fuel Cells; http://library.thinkquest.org/26366/text/alternative/hf-cell.html; Feb. 13, 2002.

Science Daily; Hydrogen Peroxide Could Power Future Fuel Cell; http://www.sciencedaily.com/releases/1999/12/991215072333.htm; Feb. 13, 2002.

Ben Wiens Energy Science Site; The Future of Fuel Cells; http://www.benwiens.com/energy4.html; Feb. 13, 2002.

Trimol Group, Inc. and Aluminum Power, Inc.; Market Potential for Metal–Air Fuel Cells; Executive Summary Report.

* cited by examiner (Prior Art Hydrogen/Oxygen Fuel Cell)

FUEL CELL

BACKGROUND OF INVENTION

1. Field of Invention

This invention relates to fuel cells, and more particularly to a compact and portable source of electrical energy from a fuel cell powered by chemically generated hydrogen and oxygen.

2. Background of the Invention

The fundamental principles of fuel cell technology are well known in the art. A fuel cell generally comprises two electrodes sandwiched around an electrolyte.

In a typical fuel cell, the fuel is consumed at the anode and the oxidizer is consumed at the cathode. The cell operates as long as the fuel and oxidant are supplied. The hydrogen-oxygen fuel cell is the best known and most developed of the fuel cells. Oxygen passes over a cathode and hydrogen over an anode. The byproducts of the fuel cell are electricity, water and heat.

An advantage of fuel cells is that they produce electrical energy as long as fuel is supplied. Various types of fuel cells include phosphoric acid-based, proton exchange membrane, solid polymer, molten carbonate, solid oxide, alkaline, direct methanol, regenerative, zinc-air, and protonic ceramic. In an aluminum-air fuel cell, power is generated through an electrochemical reaction between the aluminum, once placed in an alkaline solution, and oxygen from the air. As the aluminum oxidizes in the alkaline solution, electricity is produced. The anode dissociation of aluminum occurs at the negative electrode according to the equations: $Al+4OH^- \rightarrow AlO_2^-+2H_2O+3e^-$ and/or $Al+4OH^- \rightarrow Al(OH)_4^-+3e^-$. The cathode reduction of the oxygen occurs at the positive electrode (gas diffusion cathode) according to the equation: $O_2+2H_2O+4- \rightarrow 4OH-$.

While the aluminum-air fuel cell furthers the art in several areas, disadvantages still remain. The reaction of aluminum with water, acid or base releases hydrogen gas as a separate chemical reaction from the electrochemical reaction. In an aluminum-air galvanic cell, hydrogen production is problematic. Spent aluminum as aluminum hydroxide interferes with cell operation in an aluminum-air cell by formation of scale on cell components. Parasitic reactions of the aluminum with water drain the electrochemical energy from the cell when the cell is not in use. Once activated, the aluminum-air cell energy must be consumed until expended or it is lost by parasitic reactions.

Aluminum-air semi-fuel cells have an added disadvantage from the carbon dioxide in the air reacting with the hydroxide electrolyte in the cell to form carbonate. The carbonate limits the available hydroxide in the electrolyte.

Accordingly, what is needed in the art is a fuel cell that operates without a high pressure supply of hydrogen gas.

Another need in the art exists for a self-contained fuel cell that utilizes pure oxygen derived from chemical reaction rather than a highly pressurized source of air that contains carbon dioxide.

Another need in the art exists for a fuel cell that employs aluminum as a fuel energy source, but does not suffer from scaling or parasitic reactions.

Another need in the art exists for a light weight fuel cell energy supply that occupies a small volume.

It is, therefore, to the effective resolution of the aforementioned problems and shortcomings of the prior art that the present invention is directed. However, in view of the prior art at the time the present invention was made, it was not obvious to those of ordinary skill in the pertinent art how the identified needs could be fulfilled.

SUMMARY OF INVENTION

The present invention comprises a method of generating electrical energy from chemically generated hydrogen and oxygen. A first reaction compartment is established and hydrogen gas is generated from a reaction of aluminum metal and aqueous alkali solution in the first reaction compartment. Approximately 9 parts by weight of aluminum are required to prepare 1 part by weight of hydrogen. This reaction gives the most favorable ratio among the common active metals. Aluminum reacts with either aqueous acid or base to release hydrogen from the water. Sodium requires 23 parts by weight to prepare 1 part by weight of hydrogen. However, sodium reacts directly with water to release hydrogen and form a solution of sodium hydroxide. Sodium and aluminum metals in the first reaction compartment produce hydrogen with the simple addition of water. The alkali hydroxide used in the reaction with aluminum can either be a by-product from the generation of hydrogen from the sodium reaction or premixed with the aluminum as a dry composition. Water produced by the fuel cell may be recycled to the first reaction compartment.

A second reaction compartment is established wherein oxygen gas is generated from a reaction of oxygenated salt, water and a catalyst. Permanganates, perchlorates, peroxides, as well as other oxygenated compounds are appropriate sources for oxygen from catalyzed decomposition reactions. Oxygen gas is released as the primary product from the reaction of water with potassium superoxide or a peroxide in the presence of a catalyst.

It should be noted that the reaction compartments for the generation of hydrogen and oxygen use different chemistry but the compartments are similar in layout. Both compartments handle three phase components: (1) solid reactants; (2) product solution; and (3) evolved gases. Water is the essential reactant needed to initiate and carry out both reactions. An aqueous solution of a salt or a hydroxide initiates both oxygen and hydrogen producing reactions. In the absence of water, the other reagents can be stored premixed until needed.

A fuel cell is established having an anode and cathode. The first reaction compartment is fluidly coupled to the fuel cell anode. The second reaction compartment is fluidly coupled to the fuel cell cathode. Hydrogen gas produced in the first reaction compartment and oxygen gas produced in the second reaction compartment are fed into the fuel cell to generate electricity.

A first gas permeable membrane is disposed between the first reaction compartment and the fuel cell anode, the first gas permeable membrane adapted to pass hydrogen gas to the fuel cell anode. A second gas permeable membrane is disposed between the second reaction compartment and the fuel cell cathode, the second gas permeable membrane adapted to pass oxygen gas to the fuel cell cathode. Alkali generated in the second reaction compartment may be further used for the production of hydrogen in the first reaction compartment, but a separated alkali source is preferred.

The use of multiple reaction compartments for each gas permits the generation of electricity over extended periods of time as needed. An array of first reaction compartments fluidly coupled to the fuel cell anode by a first manifold means may be provided in addition to an array of second reaction compartments fluidly coupled to the fuel cell cathode by a second manifold means.

A controller means is provided to selectively initiate the generation of hydrogen or oxygen in the first or second reaction compartments respectively. The controller means may comprise an analog or digital solid state initiator control adapted to generate an initiation signal to release an aqueous solution from a reservoir. A first initiator conduit fluidly couples the first reaction compartment to the reservoir. Responsive to the initiation signal, the first initiator conduit flows an aqueous solution into the first reaction compartment whereby hydrogen gas is generated. A second initiator conduit fluidly couples the second reaction compartment to the reservoir. Responsive to the initiation signal, the second initiator conduit flows an aqueous solution into the second reaction compartment.

A hydrogen gas conduit fluidly couples the first reaction compartment to the anode and a hydrogen conduit fluidly couples the first reaction compartment to the fuel cell anode. An oxygen conduit fluidly couples the second reaction compartment to the fuel cell cathode.

It is therefore an object of the present invention to provide a portable supply of electricity suitable for nano or micro scale operation.

It is another object of the present invention to provide an electricity supply having a long storage life capability until activated.

It is another object of the present invention to provide a fuel cell system that does not have the hydrogen storage problems that are common in other types of fuel cells such as the proton exchange membrane (PEM).

It is another object of the present invention to provide a fuel source that does not require either high-pressure containment or a large volume.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
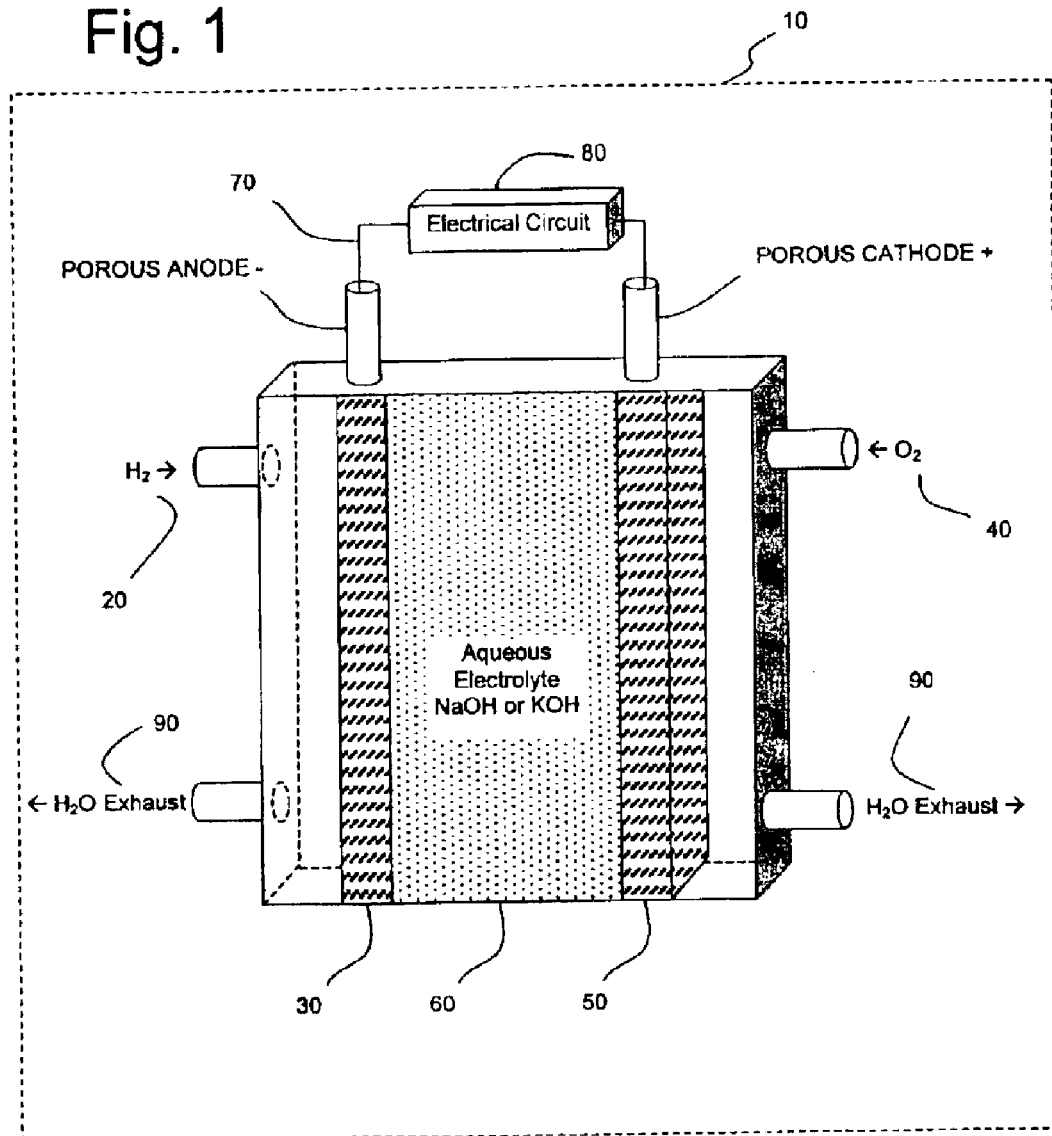
FIG. 1 is a diagrammatic view of the prior art.

FIG. 1 shows the prior art fuel cell denoted by numeral 10 as a whole. Hydrogen fuel 20 is fed into anode 30. Oxygen 40 enters the fuel cell through cathode 50. A catalytic anode 30 encourages hydrogen 20 to split into hydrogen ions ($H^+$) and electrons ($e^+$). Hydrogen ions ($H^+$) pass through electrolyte 60 while electrons $e^-$ take alternate path 70 to create electric current 80 before reaching a catalytic cathode 50 wherein oxygen 40 combines with the electrons from the current 80 and water from the electrolyte 60 to form hydroxide ions. Hydrogen ions and hydroxide ions combine in the electrolyte 60 to form water.

Figure 2:
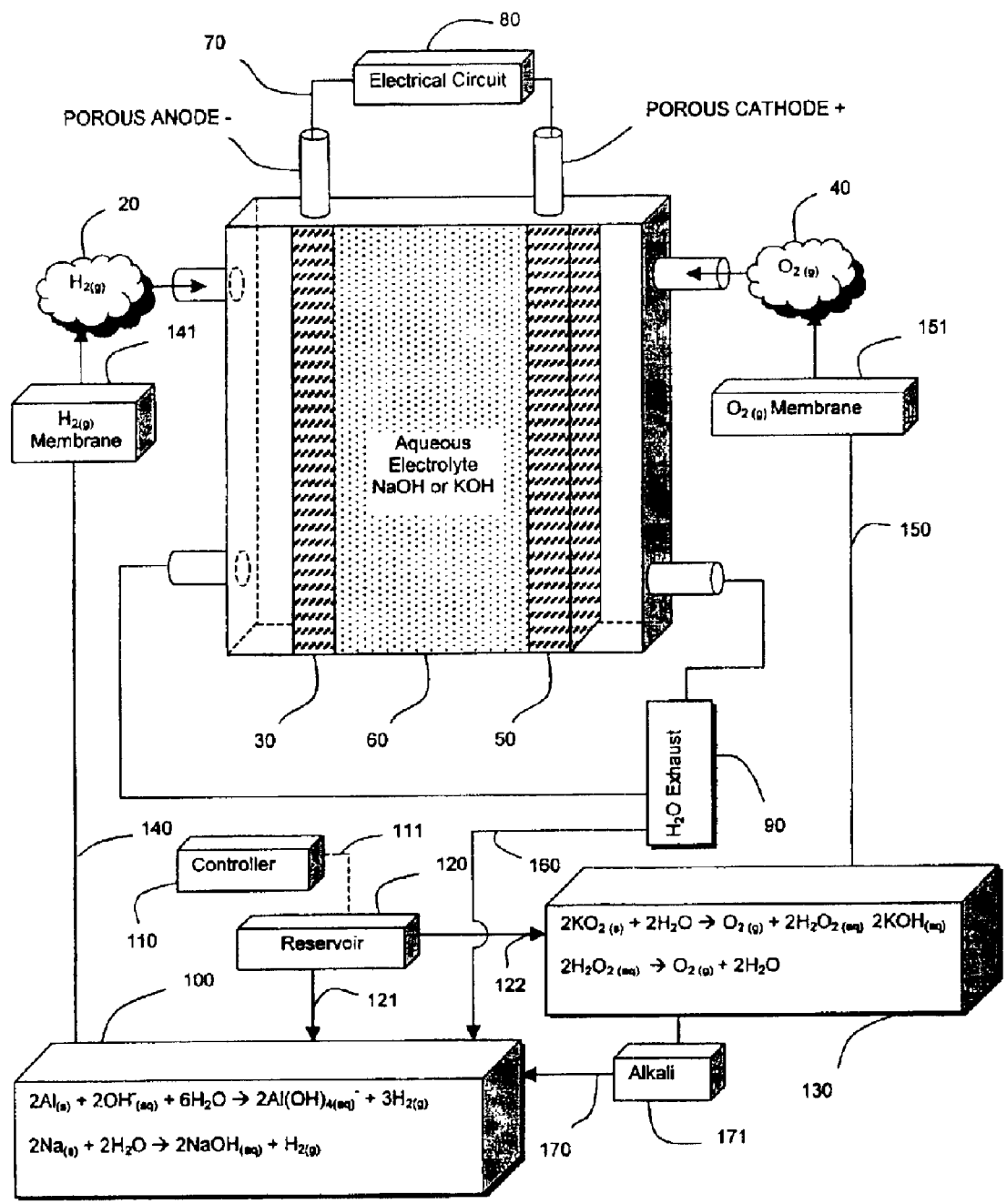
FIG. 2 is a diagrammatic view of the invention.

In FIG. 2, first reaction compartment 100 generates hydrogen gas 20 by reactions $2Al_{(s)} + 2OH^-_{(aq)} + 6H_2O \rightarrow 2Al(OH)_{4(aq)}^- + 3H_{2(g)}$ and $2Na_{(s)} + 2H_2O \rightarrow 2NaOH_{(aq)} + H_{2(g)}$. Initiator control 110 generates initiation signal 111 to reservoir 120. First initiator conduit 121 fluidly couples reservoir 120 to first reaction compartment 100. Responsive to initiation signal 111, reservoir 120 supplies an aqueous solution through first initiator conduit 121 to first reaction compartment 100 whereby hydrogen gas is generated. Hydrogen conduit 140 fluidly couples first reaction compartment 100 to anode 30. Semi-permeable gas membrane 141 is fluidly coupled in inline relation to hydrogen conduit 140 and is adapted to pass hydrogen gas 20 to anode 30. The rate of hydrogen gas production is controlled in three ways; by the particle size distribution (surface area) of the metal, by the concentration of the sodium hydroxide and by means of a regulating valve place between the anode and the reaction compartment.

Second reaction compartment 130 includes oxygenated salt and catalyst means in proportions adapted to create reactions $2KO_{2(s)} + 2H_2O \rightarrow O_{2(g)} + 2H_2O_{2(aq)} 2KOH_{(aq)}$ and $2H_2O_{2(aq)} \rightarrow O_{2(g)} + 2H_2O$. Second initiator conduit 122 fluidly couples reservoir 120 to second reaction compartment 130. Responsive to initiation signal 111, reservoir 120 supplies an aqueous solution through second initiator conduit 122 to second reaction compartment 130 whereby oxygen gas is generated. Peroxide and superoxide salts are preferred over perchlorates and nitrates. The rate of oxygen gas production is controlled in four ways; by the particle size distribution (surface area) of the metal, by the concentration of the sodium hydroxide, by selection of the catalyst for peroxide decomposition, and by means of a regulating valve place between the anode and the reaction compartment.

Oxygen conduit 150 fluidly couples second reaction compartment 130 to cathode 50. Semi-permeable gas membrane 151 is fluidly coupled in inline relation to oxygen conduit 150 and is adapted to pass oxygen gas 40 to cathode 50.

In an alternative embodiment of the invention, water recycling conduit 160 fluidly couples first reaction compartment 100 with generated water 90 whereby a continuous supply of water feeds the reactions in first reaction compartment 100. In another alternative embodiment of the invention, alkali conduit 170 fluidly couples second reaction compartment 130 with first reaction compartment 100 to supply alkali solution 171 generated by the reactions in second reaction compartment 130 to support reactions in first reaction compartment 100.

Figure 3:
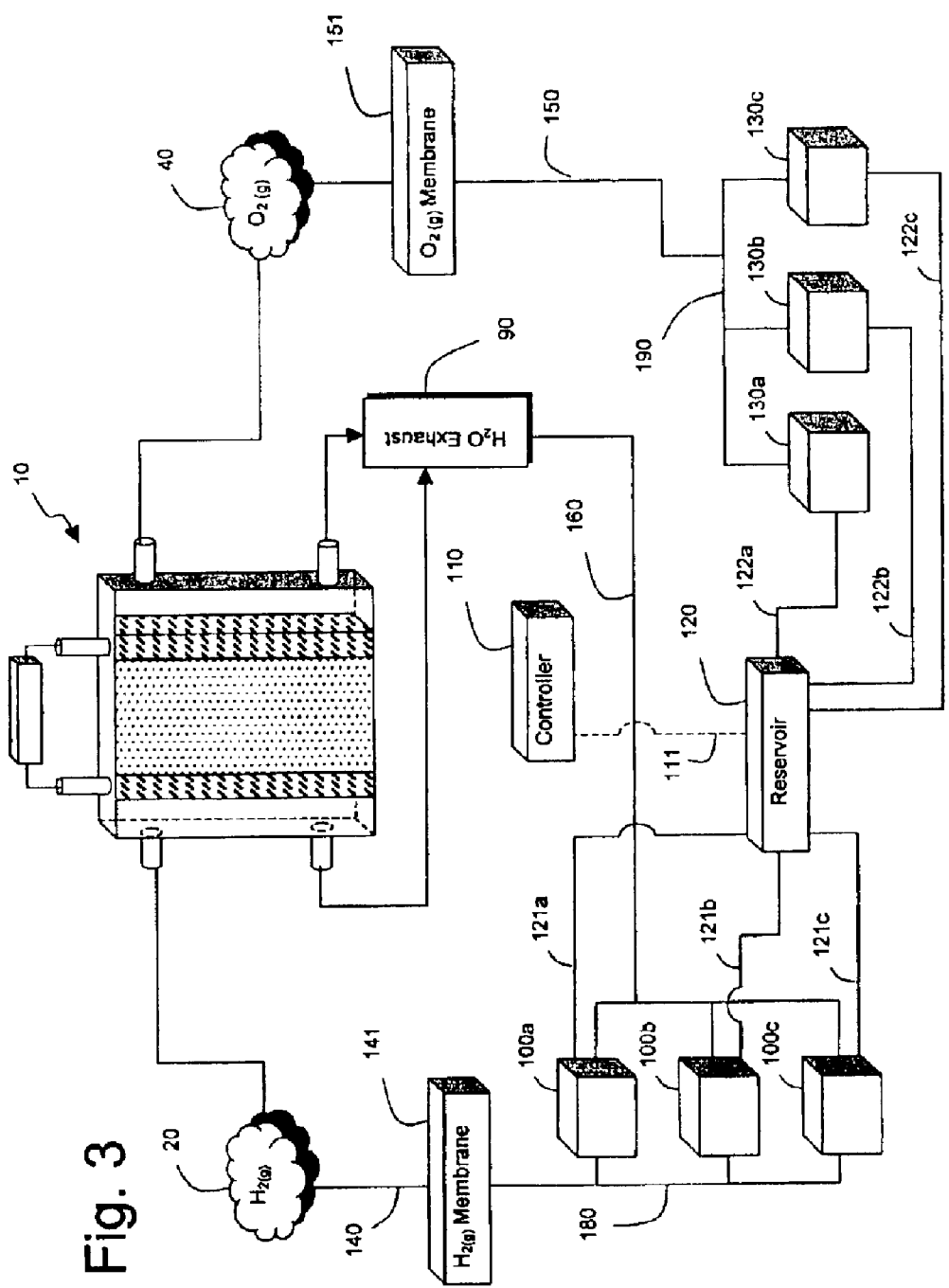
FIG. 3 is a diagrammatic view of an alternative embodiment of the invention.

FIG. 3 shows yet another alternative embodiment of the invention wherein array of first reaction compartments 100a–c are fluidly coupled to fuel cell anode 30 by first manifold 180. Array of second reaction compartments 130a–c are fluidly coupled to fuel cell cathode 50 by second manifold 190. Controller 110 generates signal 111 to reservoir 120 to selectively release an aqueous solution through first initiator conduits 121*a–c* and through second initiator conduits 122*a–c*. An advantage to using an array of first and second reaction compartments is that electrical energy may be generated over an extended period. Each compartment can be activated as needed. One fuel cell assembly is thus served by many reaction compartments.

Figure 4:
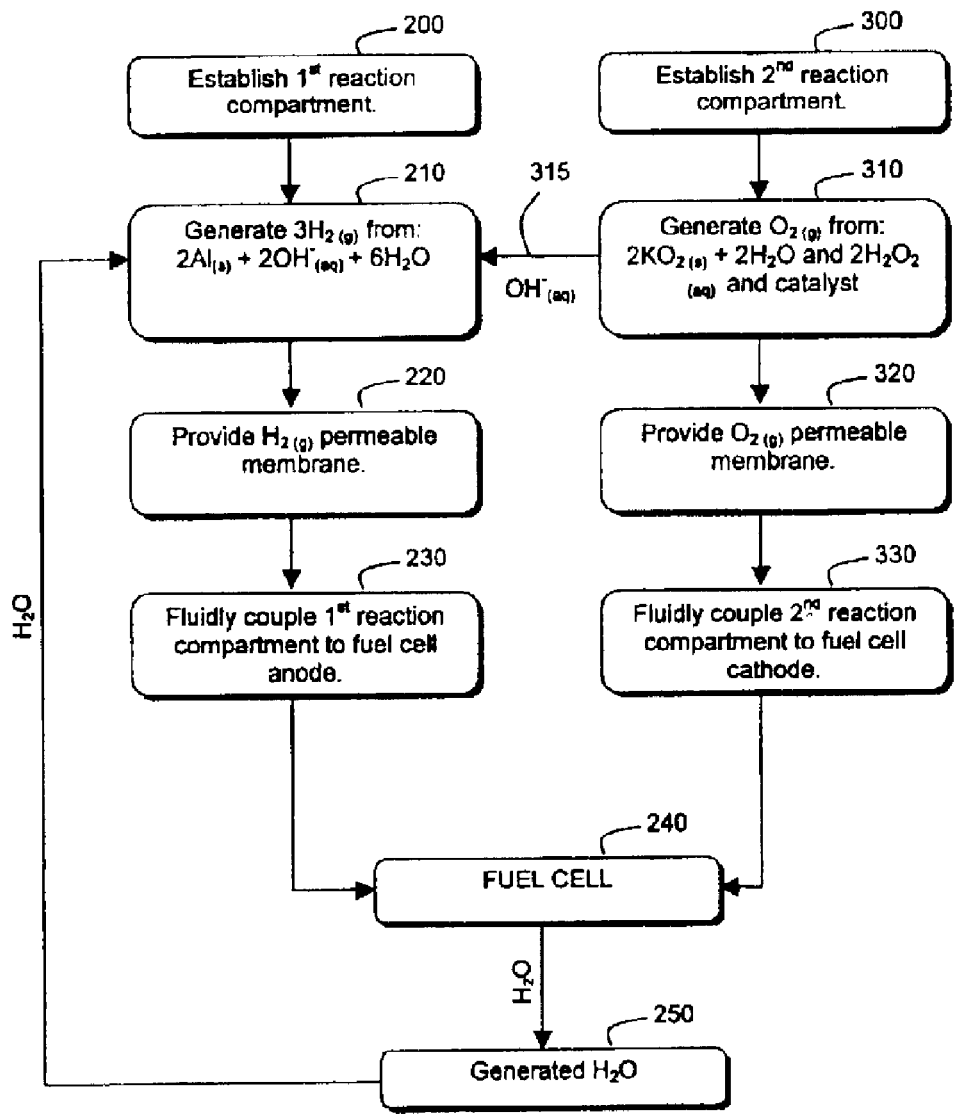
FIG. 4 is a diagrammatic view of the steps to the invention.

In FIG. 4, a first reaction compartment is established 200. Hydrogen gas is generated from reaction $2Al_{(s)} + 2OH^-_{(aq)} + 6HO$ 210. A hydrogen-permeable membrane is provided 220 inline between the first reaction compartment and the fuel cell anode which are fluidly coupled 230. A second reaction compartment is established 300 wherein oxygen gas is generated from reaction $2KO_{2(s)} + 2H_2O$ and $2H_2O_{2(aq)}$ and catalyst 310. Optionally, alkali produced in the second reaction compartment is fed 315 into the first reaction compartment. An oxygen-permeable membrane is provided 320 inline between the second reaction compartment and the fuel cell cathode which are fluidly coupled 330. Fuel cell 240 generates electricity from the hydrogen and oxygen gases. Water is produced 250 which is recycled to reaction 210.

Figure 5:
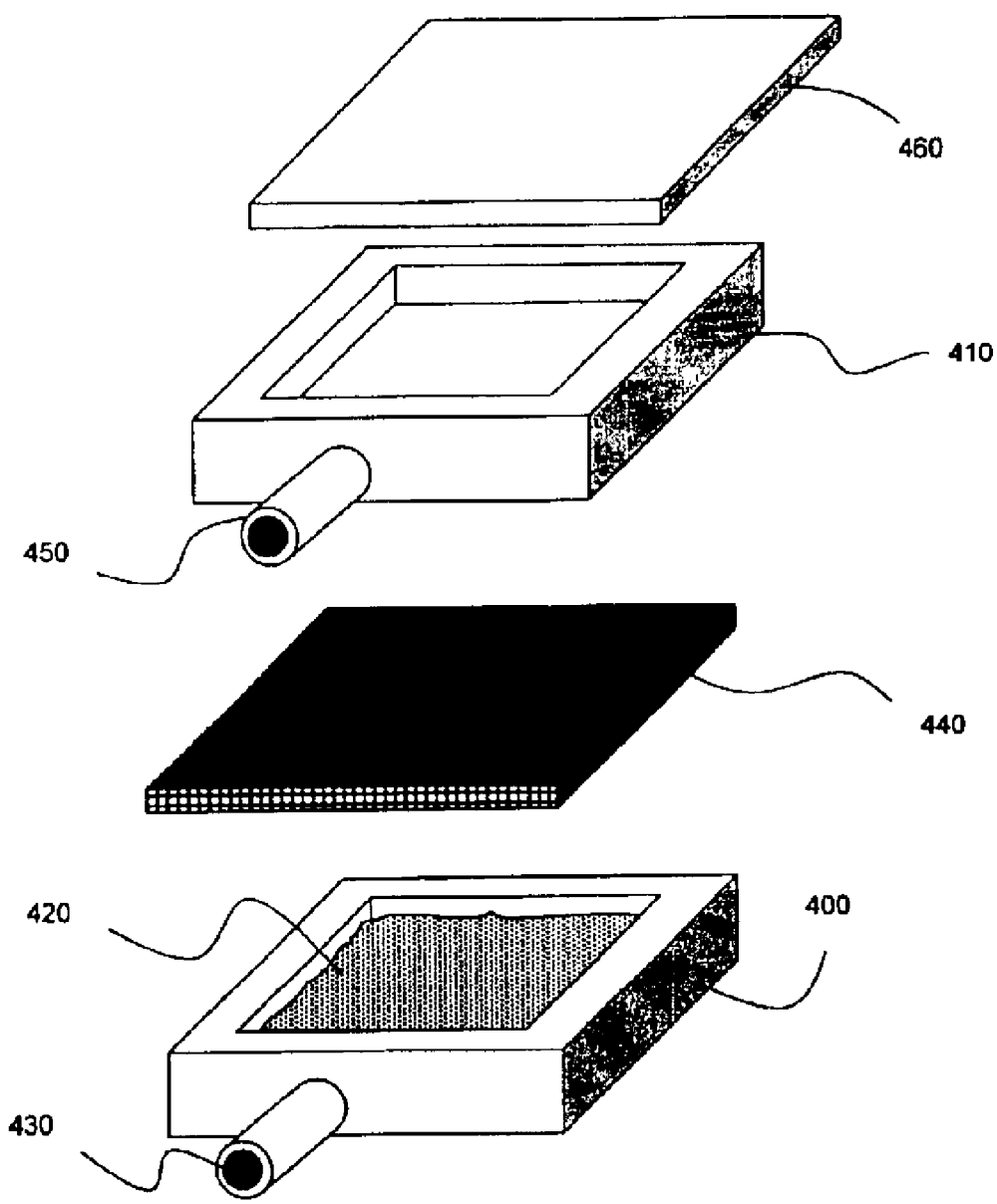
FIG. 5 is an exploded view of the reaction compartment.

An exploded view of the reaction compartment is shown in FIG. 5. The compartment is divided into first region 400 and second region 410 that are connected to different parts of the outside assembly. First region 400 contains reagents 420 and is connected to an outside source of water 120 (FIG. 2) or alkali 171 (FIG. 2) through first conduit 430 that can be closed off after addition of the reagents. The two regions are partitioned from each other by means of gas permeable membrane 440 such as expanded polytetrafluoroethylene (PTFE). Gas permeable membrane 440 acts as a hydrophobic surface for the reaction solution while transporting the gas across the membrane 440. Second region 410 (adapted to collect the generated gas) is partitioned from reagents 420 and is connected 450 directly to fuel cell anode 30 by hydrogen conduit 140 in the case of the reaction releasing hydrogen 20 and to the fuel cell cathode 50 by oxygen conduit 150 in the case of the reaction releasing oxygen 40. A cover 460 is provided to facilitate the exploded view of the reaction compartment, but may be integral in a preferred embodiment.

Each reaction compartment is designed to release enough hydrogen fuel or oxygen to satisfy a particular energy need. Two factors are important to the design. The size of the compartment is based upon the stochiometry needed to handle the reagents. Rate of release of the gases is controlled by reaction parameters within the reaction compartment. The rate of hydrogen evolution is controlled by the available surface area of the aluminum and the concentration of the alkali metal hydroxide within the reaction compartment. Volume of gas released depends upon the amount of alkali and aluminum available.

The novel fuel cell disclosed herein is an attractive solution for an onsite or storage source of hydrogen and oxygen. Any consideration of hydrogen and/or oxygen as a fuel cell feedstock source requires accounting for storage, safety, mobility, purity and environmental concerns as part of the system mass and cost. As a low density solid, aluminum does not require either high-pressure containment or a large volume. Hydrogen is generated as needed. Premade hydrogen requires high-pressure storage and both the mass and volume of the storage container and high pressure handling system factor into the disadvantages of the prior art methods. High-pressure vessels can rupture or leak and release the flammable contents. Accordingly, the present invention advances the art of fuel cells in safety, storage, size, output duration and lifespan.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed:

1. A method of generating electrical energy from chemically generated hydrogen and oxygen comprising the steps of:

establishing a first reaction compartment;

generating hydrogen gas from a reaction of aluminum metal and aqueous alkali solution in the first reaction compartment;

establishing a second reaction compartment;

generating oxygen gas from a reaction of oxygenated salt, water and a catalyst in the second reaction compartment;

establishing a fuel cell having an anode and cathode;

fluidly coupling the first reaction compartment to the fuel cell anode;

fluidly coupling the second reaction compartment to the fuel cell cathode; and feeding the hydrogen and oxygen gas to the fuel cell to generate electricity.

2. The method of claim 1 further comprising the step of providing a first gas permeable membrane disposed between the first reaction compartment and the fuel cell anode, the first gas permeable membrane adapted to pass hydrogen gas to the fuel cell anode.

3. The method of claim 1 further comprising the step of providing a second gas permeable membrane disposed between the second reaction compartment and the fuel cell cathode, the second gas permeable membrane adapted to pass oxygen gas to the fuel cell cathode.

4. The method of claim 1 further comprising the step of recycling alkali generated in the second reaction compartment to the first reaction compartment.

5. The method of claim 1 further comprising the step of recycling water produced by the fuel cell to the first reaction compartment.

6. The method of claim 1 further comprising an array of first reaction compartments fluidly coupled to the fuel cell anode by a first manifold means.

7. The method of claim 6 further comprising a controller means adapted to selectively initiate the generation of hydrogen in one or more first reaction compartments as needed.

8. The method of claim 1 further comprising an array of second reaction compartments fluidly coupled to the fuel cell cathode by a second manifold means.

9. The method of claim 8 further comprising a controller means adapted to selectively initiate the generation of oxygen in one or more second reaction compartments as needed.

10. A method of generating electrical energy from chemically generated hydrogen and oxygen comprising the steps of:

establishing a first reaction compartment;

generating hydrogen gas from a reaction of aluminum metal and aqueous alkali solution in the first reaction compartment;

establishing a second reaction compartment;

generating oxygen gas from a reaction of oxygenated salt, water and a catalyst in the second reaction compartment;

establishing a fuel cell having an anode and cathode;

fluidly coupling the first reaction compartment to the fuel cell anode;

fluidly disposing a first gas permeable membrane between the first reaction compartment and the fuel cell anode, the first gas permeable membrane adapted to pass hydrogen gas to the fuel cell anode;

fluidly coupling the second reaction compartment to the fuel cell cathode;

fluidly disposing a second gas permeable membrane between the second reaction compartment and the fuel cell cathode, the second gas permeable membrane adapted to pass oxygen gas to the fuel cell cathode;

feeding the hydrogen and oxygen gas to the fuel cell to generate electricity; and recycling water produced by the fuel cell to the first reaction compartment.

* * * * *